United States Patent
Yalamanchili et al.

(10) Patent No.: US 8,954,780 B1
(45) Date of Patent: Feb. 10, 2015

(54) SYSTEMS AND METHODS FOR TRANSFERRING INPUT/OUTPUT OPERATIONS WITHIN COMPUTER CLUSTERS

(71) Applicant: Symantec Corporation, Mountain View, CA (US)

(72) Inventors: Chaitanya Yalamanchili, Sunnyvale, CA (US); Prasanta Dash, San Jose, CA (US); Asmita Jagtap, Maharashtra (IN); Sudhakar Kasina, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 188 days.

(21) Appl. No.: 13/650,029

(22) Filed: Oct. 11, 2012

(51) Int. Cl.
*G06F 11/00* (2006.01)

(52) U.S. Cl.
USPC .......................................... 714/4.1; 714/5.11

(58) Field of Classification Search
CPC ............ G06F 11/2005; G06F 11/2017; G06F 11/2089; G06F 11/2092
USPC ................................................. 714/4.1, 5.11
See application file for complete search history.

(56) References Cited

U.S. PATENT DOCUMENTS

| | | | | |
|---|---|---|---|---|
| 5,790,775 A * | 8/1998 | Marks et al. | ................ | 714/5.11 |
| 6,330,687 B1 * | 12/2001 | Griffith | ................ | 714/6.21 |
| 6,578,158 B1 * | 6/2003 | Deitz et al. | ................ | 714/11 |
| 7,260,737 B1 * | 8/2007 | Lent et al. | ................ | 714/5.11 |
| 7,370,147 B2 * | 5/2008 | Nakamura et al. | ................ | 711/114 |
| 7,437,423 B1 * | 10/2008 | Gole | ................ | 709/212 |
| 7,979,517 B1 * | 7/2011 | Wang et al. | ................ | 709/221 |
| 8,060,695 B1 * | 11/2011 | Lee et al. | ................ | 711/114 |
| 2003/0126315 A1 * | 7/2003 | Tan et al. | ................ | 710/1 |
| 2005/0010843 A1 * | 1/2005 | Iwamitsu et al. | ................ | 714/724 |
| 2005/0102557 A1 * | 5/2005 | Davies et al. | ................ | 714/11 |
| 2005/0207105 A1 * | 9/2005 | Davies | ................ | 361/683 |
| 2006/0282701 A1 * | 12/2006 | Davies et al. | ................ | 714/6 |

* cited by examiner

*Primary Examiner* — Joshua Lohn
(74) *Attorney, Agent, or Firm* — ALG Intellectual Property, LLC

(57) ABSTRACT

A computer-implemented method for transferring input/output operations within computer clusters may include (1) identifying a computer cluster that includes (i) a plurality of nodes configured to facilitate access to a plurality of physical storage devices and (ii) at least one computing object that represents data stored on the physical storage devices, (2) detecting at least one failure that prevents at least one node within the computer cluster from performing at least one input/output operation on the computing object that represents the data stored on the physical storage devices, (3) identifying at least one other node within the computer cluster that is able to perform the input/output operation on the computing object, and then (4) directing the other node within the computer cluster to perform the input/output operation on the computing object. Various other methods, systems, and computer-readable media are also disclosed.

19 Claims, 7 Drawing Sheets

SYSTEMS AND METHODS FOR TRANSFERRING INPUT/OUTPUT OPERATIONS WITHIN COMPUTER CLUSTERS

BACKGROUND

Computer clusters often manage data stored across multiple physical storage devices (such as disks) by grouping the data into one or more computing objects (such as plexes and/or volumes) that represent logically sequential blocks. For example, a computer cluster may group data into a mirrored volume that includes duplicate copies of data stored across multiple disks. In this example, the mirrored volume may virtualize the data stored across the multiple disks such that the volume appears as a single disk to the cluster's applications.

Some computer clusters may include multiple nodes that are able to perform input/output operations on data grouped into such computing objects. For example, a computer cluster may include multiple nodes that are able to perform input/output operations on a mirrored volume spanning multiple disks. In the event that the computer cluster experiences a failure that prevents one of the nodes from performing certain input/output operations, the computer cluster may transfer the responsibility of performing such input/output operations to another node within the computer cluster (in a process sometimes referred to as "input/output shipping").

While conventional input/output shipping techniques may enable computer clusters to transfer the responsibility of performing certain input/output operations from one node to another, such input/output shipping techniques may also have one or more shortcomings and/or inefficiencies that negatively impact the performance of the clusters. For example, in a conventional input/output shipping technique, a computer cluster may transfer the responsibility of performing input/output operations on a mirrored volume from one node to another by directing the other node to target the individual disks storing the data represented by the mirrored volume. Unfortunately, since this conventional input/output shipping technique involves directing the other node to target the individual disks storing the data represented by the mirrored volume, the computer cluster may need to transfer a different instance of the same data over the network for each disk storing the data represented by the mirrored volume.

As such, the instant disclosure identifies a need for systems and methods for transferring input/output operations within computer clusters in a manner that reduces the amount of network traffic associated with input/output shipping by avoiding redundant data transfers.

SUMMARY

As will be described in greater detail below, the instant disclosure generally relates to systems and methods for transferring input/output operations within computer clusters in a manner that reduces network traffic by avoiding redundant data transfers and performing at least a portion of the input/output operations locally when possible.

In one example, a computer-implemented method for transferring input/output operations within computer clusters may include (1) identifying a computer cluster that includes (i) a plurality of nodes configured to facilitate access to a plurality of physical storage devices and (ii) at least one computing object that represents data stored on the physical storage devices, (2) detecting at least one failure that prevents at least one node within the computer cluster from performing at least one input/output operation (such as at least one read and/or write operation) on the computing object that represents the data stored on the physical storage devices, (3) identifying at least one other node within the computer cluster that is able to perform the input/output operation on the computing object, and then (4) directing the other node within the computer cluster to perform the input/output operation on the computing object by (i) identifying input/output data that facilitates performing the input/output operation on the computing object, (ii) transferring a single instance of the input/output data to the other node instead of transferring a different instance of input/output data for each physical storage device storing the data represented by the computing object, and then (iii) enabling the other node to perform the input/output operation on the computing object based at least in part on the single instance of input/output data transferred to the other node.

Examples of the computing object include, without limitation, one or more plex objects that represent duplicate copies of data stored on the plurality of physical storage devices, a mirrored volume object that includes a plurality of plex objects that represent duplicate copies of data stored on the plurality of physical storage devices, a striped volume object comprising a plurality of logically sequential stripes of data stored on the plurality of physical storage devices, and/or any other suitable computing object.

In some examples, the method may also include analyzing evidence of the failure that prevents the node from performing the input/output operation on the computing object. In such examples, the method may further include determining that the scope of the failure is limited to the computing object based at least in part on the analysis of the evidence. In addition, the method may include directing the other node to perform the input/output operation by specifically targeting the computing object instead of targeting the plurality of physical storage devices since the scope of the failure is limited to the computing object.

In some examples, the method may also include identifying at least one source object (such as at least one plex object and/or volume object) that includes the input/output data to be written to the computing object as part of the input/output operation. In such examples, the method may further include directing the other node to obtain a single instance of the input/output data from the source object and then use the single instance to write the input/output data to the computing object instead of obtaining a different instance of input/output data for each physical storage device storing the data represented by the computing object.

In some examples, the method may also include determining that the node is unable to perform the input/output operation on the computing object. In such examples, the method may further include determining that the node within the computer cluster is able to access at least one source object that includes the input/output data but unable to access the computing object. In addition, the method may include determining that the other node within the computer cluster is able to access the computing object.

In some examples, the method may also include directing the node to obtain a single instance of the input/output data from the source object and then transfer the single instance of the input/output data to the other node. In such examples, the method may further include enabling the other node to use the transferred single instance to write the input/output data to the computing object by copying at least a portion of the transferred single instance to at least a portion of each physical storage device that stores the data represented by the computing object.

In some examples, the method may also include determining that the node within the computer cluster is able to access a portion of the computing object but unable to access another portion of the computing object. In such examples, the method may further include determining that the other node within the computer cluster is able to access the other portion of the computing object.

In some examples, the method may also include identifying at least one source object that includes the input/output data to be written to the computing object. In such examples, the method may further include directing the node to obtain a single instance of the input/output data from the source object and then use the obtained single instance to write the input/output data to the portion of the computing object since the node is able to access the portion of the computing object. In addition, the method may include directing the other node to obtain a single instance of the input/output data from the source object and then use the obtained single instance to write the input/output data to the other portion of the computing object since the other node is able to access the other portion of the computing object.

In some examples, the method may also include identifying at least one source object that includes the input/output data to be written to the computing object. In such examples, the method may further include creating a list that identifies the source object that includes the input/output data and the computing object. In addition, the method may include providing the list to the other node to enable the other node to perform the input/output operation on the computing object based at least in part on the single instance of input/output data transferred to the other node.

In some examples, the method may also include determining that none of the nodes included in the computer cluster is able to individually perform the input/output operation on the computing object.

In one embodiment, a system for implementing the above-described method may include (1) an identification module programmed to identify a computer cluster that comprises (i) a plurality of nodes configured to facilitate access to a plurality of physical storage devices and (ii) at least one computing object that represents data stored on the physical storage devices, (2) a detection module programmed to detect at least one failure that prevents at least one node within the computer cluster from performing at least one input/output operation on the computing object that represents the data stored on the physical storage devices, and (3) a director module programmed to (i) identify at least one other node within the computer cluster that is able to perform the input/output operation on the computing object and (ii) direct the other node within the computer cluster to perform the input/output operation on the computing object by (a) identifying input/output data that facilitates performing the input/output operation on the computing object, (b) transferring a single instance of the input/output data to the other node instead of transferring a different instance of input/output data for each physical storage device storing the data represented by the computing object, and (c) enabling the other node to perform the input/output operation on the computing object based at least in part on the single instance of input/output data transferred to the other node.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify a computer cluster that includes (i) a plurality of nodes configured to facilitate access to a plurality of physical storage devices and (ii) at least one computing object that represents data stored on the physical storage devices, (2) detect at least one failure that prevents at least one node within the computer cluster from performing at least one input/output operation on the computing object that represents the data stored on the physical storage devices, (3) identify at least one other node within the computer cluster that is able to perform the input/output operation on the computing object, and then (4) direct the other node within the computer cluster to perform the input/output operation on the computing object by (i) identifying input/output data that facilitates performing the input/output operation on the computing object, (ii) transferring a single instance of the input/output data to the other node instead of transferring a different instance of input/output data for each physical storage device storing the data represented by the computing object, and then (iii) enabling the other node to perform the input/output operation on the computing object based at least in part on the single instance of input/output data transferred to the other node.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
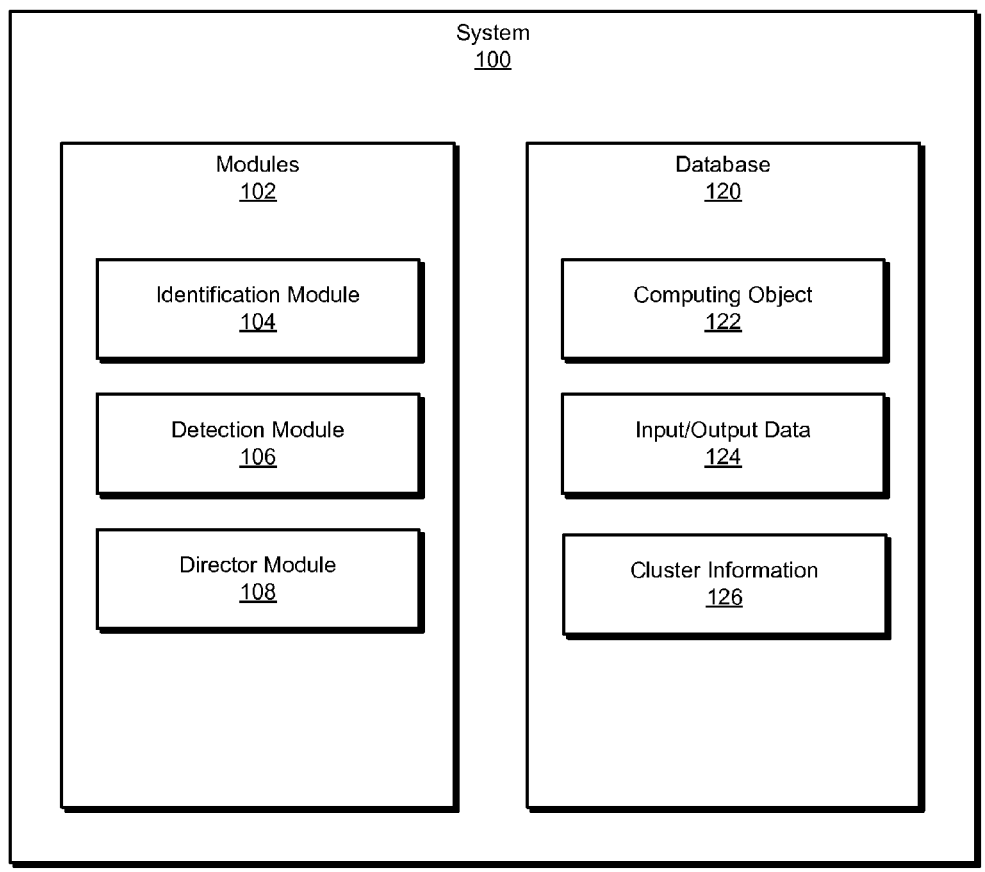
FIG. 1 is a block diagram of an exemplary system for transferring input/output operations within computer clusters.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for transferring input/output operations within computer clusters. As will be explained in greater detail below, by transferring a single instance of input/output data from a source node to a target node instead of transferring a different instance of input/output data for each physical storage device storing data represented by a target computing object, the various systems and methods described herein may reduce the amount of storage and/or network traffic associated with input/output shipping.

By transferring the single instance of input/output data from the source node to the target node, the various systems and methods described herein may also reduce the amount of metadata (including, e.g., messaging overhead associated with network routing) needed to complete input/output operations shipped from the source node to the target node. In addition, by using the transferred single instance to perform input/output operations on one or more target computing objects spanning a plurality of physical computing devices, the various systems and methods described herein may reduce the amount of time needed to complete the input/output operations shipped from the source node to the target node (i.e., reduce the input/output latency associated with input/output shipping).

Figure 2:
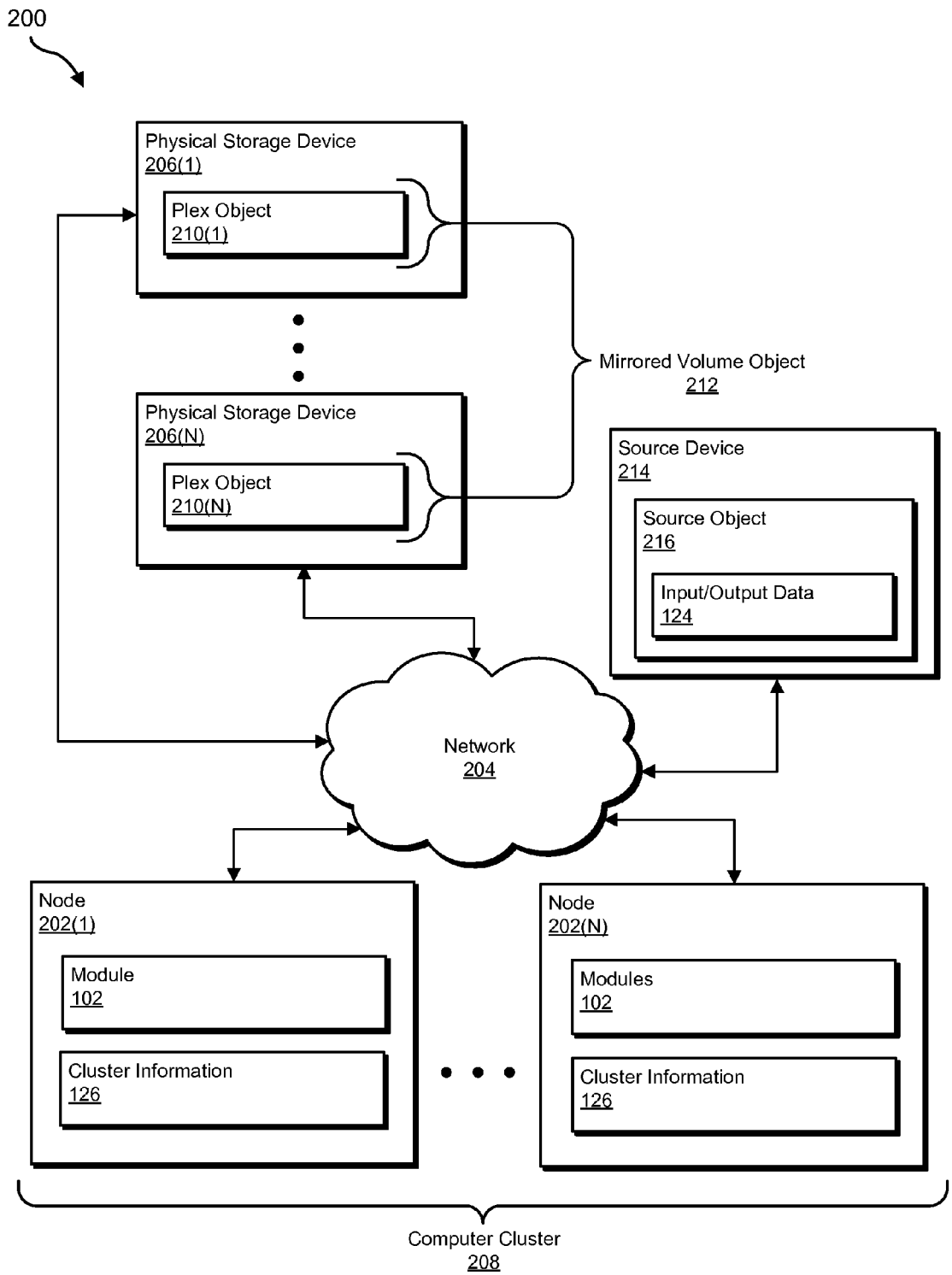
FIG. 2 is a block diagram of an exemplary system for transferring input/output operations within computer clusters.
Figure 3:
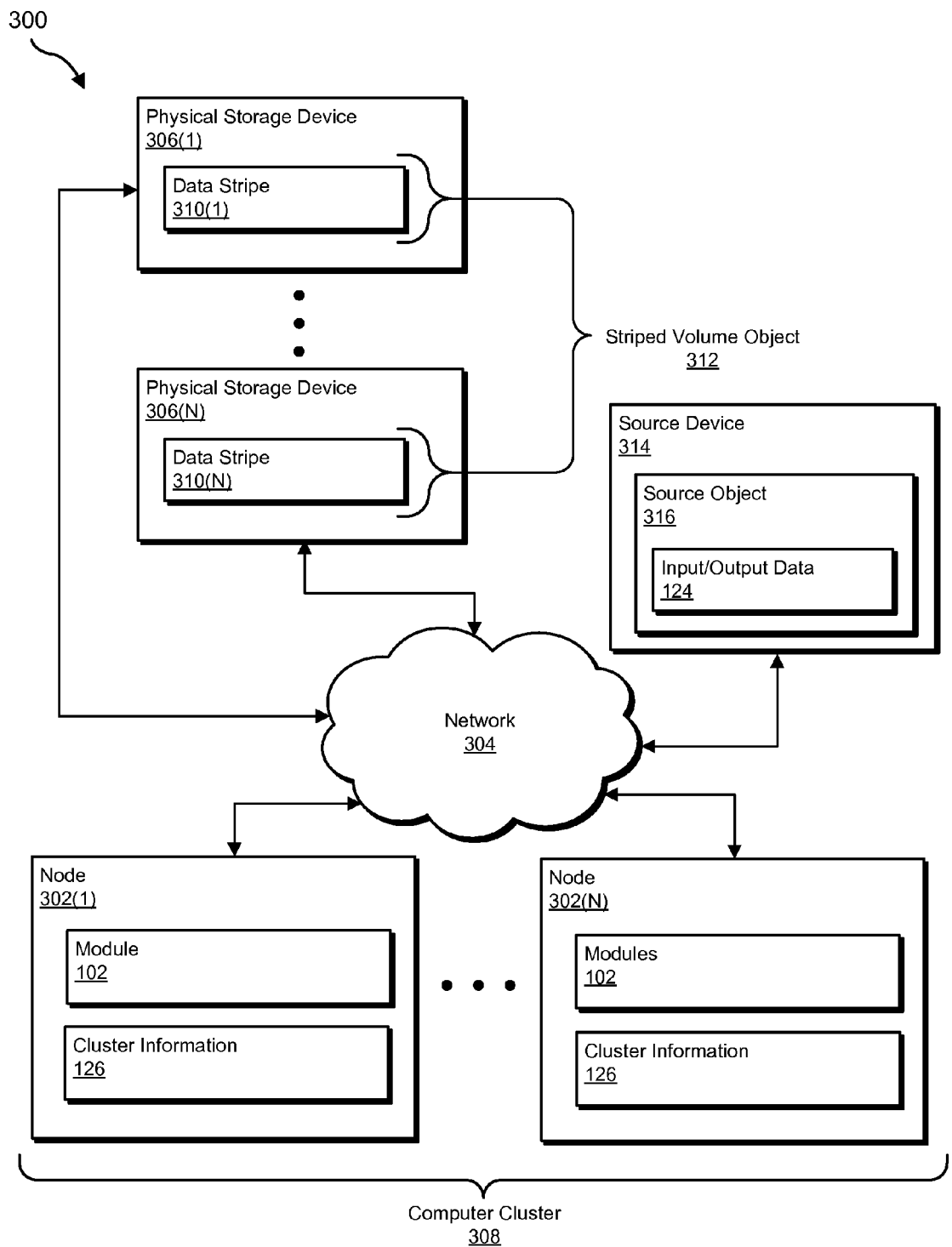
FIG. 3 is a block diagram of an exemplary system for transferring input/output operations within computer clusters.

The following will provide, with reference to FIGS. 1-3, detailed descriptions of exemplary systems for transferring input/output operations within computer clusters. Detailed descriptions of corresponding computer-implemented methods will be provided in connection with FIG. 4. Detailed descriptions of an exemplary list that identifies input/output shipping information will be provided in connection with FIG. 5. In addition, detailed descriptions of an exemplary computing system and network architecture capable of implementing one or more of the embodiments described herein will be provided in connection with FIGS. 6 and 7, respectively.

FIG. 1 is a block diagram of an exemplary system 100 for transferring input/output operations within computer clusters. As illustrated in this figure, exemplary system 100 may include one or more modules 102 for performing one or more tasks. For example, and as will be explained in greater detail below, exemplary system 100 may include an identification module 104 programmed to identify a computer cluster that comprises (1) a plurality of nodes configured to facilitate access to a plurality of physical storage devices and (2) at least one computing object that represents data stored on the physical storage devices. Exemplary system 100 may also include a detection module 106 programmed to detect at least one failure that prevents at least one node within the computer cluster from performing at least one input/output operation on the computing object that represents the data stored on the physical storage devices.

In addition, and as will be described in greater detail below, exemplary system 100 may include a director module 108 programmed to (1) identify at least one other node within the computer cluster that is able to perform the input/output operation on the computing object and (2) direct the other node within the computer cluster to perform the input/output operation on the computing object by (i) identifying input/output data that facilitates performing the input/output operation on the computing object, (ii) transferring a single instance of the input/output data to the other node instead of transferring a different instance of input/output data for each physical storage device storing the data represented by the computing object, and (iii) enabling the other node to perform the input/output operation on the computing object based at least in part on the single instance of input/output data transferred to the other node. Although illustrated as separate elements, one or more of modules 102 in FIG. 1 may represent portions of a single module or application (such as SYMANTEC'S VERITAS CLUSTER SERVER or VERITAS VOLUME MANAGER).

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., nodes 202(1)-(N), physical storage devices 206(1)-(N), and/or source device 214), the devices illustrated in FIG. 3 (e.g., nodes 302(1)-(N), physical storage devices 306(1)-(N), and/or source device 314), computing system 610 in FIG. 6, and/or portions of exemplary network architecture 700 in FIG. 7. One or more of modules 102 in FIG. 1 may also represent all or portions of one or more special-purpose computers configured to perform one or more tasks.

As illustrated in FIG. 1, exemplary system 100 may also include one or more databases, such as database 120. In one example, database 120 may be configured to store may be configured to store any type or form of data or information used to perform input/output shipping within a computer cluster. For example, database 120 may be configured to store (1) a computing object 122 that represent any type or form of logical object (such as one or more of plex objects 210(1)-(N) or mirrored volume object 212) that includes data grouped into logically sequential blocks within the computer cluster, (2) input/output data 124 that represents any type or form of data used to perform or complete one or more input/output operations shipped from a source node to a target node within the computer cluster, and/or (3) cluster information 126 that identifies the hardware and/or software configuration of the computer cluster.

Database 120 may represent portions of a single database or computing device or a plurality of databases or computing devices. For example, database 120 may represent a portion of physical storage devices 206(1)-(N), nodes 202(1)-(N), and/or source device 214 in FIG. 2, physical storage devices 306(1)-(N), nodes 302(1)-(N), and/or source device 314 in FIG. 3, computing system 610 in FIG. 6, and/or portions of exemplary network architecture 700 in FIG. 7. Alternatively, database 120 in FIG. 1 may represent one or more physically separate devices capable of being accessed by a computing device, such as physical storage devices 206(1)-(N), nodes 202(1)-(N), and/or source device 214 in FIG. 2, physical storage devices 306(1)-(N), nodes 302(1)-(N), and/or source device 314 in FIG. 3, computing system 610 in FIG. 6, and/or portions of exemplary network architecture 700 in FIG. 7.

Exemplary system 100 in FIG. 1 may be implemented in a variety of ways. For example, all or a portion of exemplary system 100 may represent portions of exemplary system 200 in FIG. 2. As shown in FIG. 2, system 200 may represent a computer cluster 208 that includes nodes 202(1)-(N) in communication with physical storage devices 206(1)-(N) and source device 214 via a network 204. Nodes 202(1)-(N) may be programmed with one or more of modules 102 and/or may store all or a portion of the data in database 120. Additionally or alternatively, physical storage devices 206(1)-(N) and/or source device 214 may be programmed with one or more of modules 102 and/or may store all or a portion of the data in database 120.

In one example, physical storage devices 206(1)-(N) may be configured to store one or more computing objects that represent logically sequential blocks. For example, as shown in FIG. 2, physical storage devices 206(1)-(N) may store a mirrored volume object 212 that includes plex objects 210(1)-(N). The term "plex object," as used herein, generally refers to any type or form of group or collection of contiguous memory locations (or subdisks) that store specific data on at least one physical storage device. In addition, the term "mirrored volume object," as used herein, generally refers to any type or form of logical unit (such as a Redundant Array of Independent Disks (RAID) 1, RAID 10, or RAID 0+1 configuration) that identifies a set of redundant plex objects representing duplicate copies of data stored on a plurality of physical storage devices.

In one example, source device 214 may be configured to store any type or form of input/output data used to facilitate transferring input/output operations within computer cluster 208. For example, as shown in FIG. 2, source device 214 may store source object 216 that includes input/output data 124. The term "source object," as used herein, generally refers to any type or form of computing object (such as a plex object or a volume object) that represents logically sequential blocks from which input/output data is obtained to facilitate transferring input/output operations within a computer cluster. Although FIG. 2 illustrates source object 216 independent of plex objects 210(1)-(N), source object 216 may also represent one or more plex objects included in mirrored volume object 212.

In another example, all or a portion of exemplary system 100 may represent portions of exemplary system 300 in FIG. 3. As shown in FIG. 3, system 300 may represent a computer cluster 308 that includes nodes 302(1)-(N) in communication with physical storage devices 306(1)-(N) and source device 314 via a network 304. Nodes 302(1)-(N) may be programmed with one or more of modules 102 and/or may store all or a portion of the data in database 120. Additionally or alternatively, physical storage devices 306(1)-(N) and/or source device 314 may be programmed with one or more of modules 102 and/or may store all or a portion of the data in database 120.

In one example, physical storage devices 306(1)-(N) may be configured store one or more computing objects that represent logically sequential blocks. For example, as shown in FIG. 3, physical storage devices 306(1)-(N) may store a striped volume object 312 that includes data stripes 310(1)-(N). In this example, data stripes 310(1)-(N) may collectively represent a single plex object that has been spread across physical storage devices 306(1)-(N) without data redundancy.

The term "data stripe," as used herein, generally refers to any type or form of group or collection of contiguous memory locations (or subdisks) that store specific data on a physical storage device. In addition, the term "striped volume object," as used herein, generally refers to any type or form of logical unit (such as a RAID 0, RAID 5, RAID 10, RAID 0+1, or concatenated disk configuration) that identifies a set of data stripes that each represent unique data allocated alternately and evenly across a plurality of physical storage devices.

In one example, source device 314 may be configured to store any type or form of input/output data used to facilitate transferring input/output operations within computer cluster 308. For example, as shown in FIG. 3, source device 314 may store source object 316 that includes input/output data 124.

Although FIG. 3 illustrates source object 316 independent of data stripes 310(1)-(N), source object 316 may also represent one or more data stripes included in striped volume object 312.

In one embodiment, one or more of modules 102 from FIG. 1 may, when executed by at least one processor associated with nodes 202(1)-(N) and/or 302(1)-(N), facilitate one or more of nodes 202(1)-(N) and/or 302(1)-(N) in transferring input/output operations within computer clusters. For example, and as will be described in greater detail below, one or more of modules 102 may cause one or more of nodes 202(1)-(N) and/or 302(1)-(N) to (1) identify a computer cluster (e.g., computer cluster 208 or 308) that includes (i) a plurality of nodes (e.g., nodes 202(1)-(N) and/or 302(1)-(N)) configured to facilitate access to a plurality of physical storage devices (e.g., physical storage devices 206(1)-(N) and/or 306(1)-(N)) and (ii) at least one computing object (e.g., at least one of plex objects 210(1)-(N), mirrored volume object 212, and/or striped volume object 312) that represents data stored on the physical storage devices, (2) detect at least one failure that prevents at least one node (e.g., at least one of node 202(1) and 302(1)) within the computer cluster from performing at least one input/output operation on the computing object that represents the data stored on the physical storage devices, (3) identify at least one other node (e.g., at least one of node 202(N) and 302(N)) within the computer cluster that is able to perform the input/output operation on the computing object, and then (4) direct the other node within the computer cluster to perform the input/output operation on the computing object by (i) identifying input/output data 124 that facilitates performing the input/output operation on the computing object, (ii) transferring a single instance of input/output data 124 to the other node instead of transferring a different instance of input/output data 124 for each physical storage device storing the data represented by the computing object, and then (iii) enabling the other node to perform the input/output operation on the computing object based at least in part on the single instance of input/output data 124 transferred to the other node.

Nodes 202(1)-(N) and 302(1)-(N) generally represent any type or form of computing device capable of reading computer-executable instructions. Examples of nodes 202(1)-(N) and 302(1)-(N) include, without limitation, laptops, desktops, servers, cellular phones, personal digital assistants (PDAs), multimedia players, embedded systems, combinations of one or more of the same, exemplary computing system 610 in FIG. 6, and/or any other suitable nodes.

Computer clusters 208 and 308 generally represent a group of two or more nodes capable of communicating with one another to collectively perform one or more tasks (such as collectively providing high availability of one or more applications). Examples of computer clusters 208 and 308 include, without limitation, high-availability clusters, load-balancing clusters, Beowolf clusters, high-performance computing clusters, disaster-recovery clusters, and/or any other suitable computer clusters.

Physical storage devices 206(1)-(N) and 306(1)-(N) generally represent any type or form of physical storage device capable of communicating with (or being accessed by) one or more nodes and storing data grouped into logically sequential blocks. Examples of physical storage devices 206(1)-(N) and 306(1)-(N) include, without limitation, storage arrays, disk arrays, disk storage devices, disk array controllers, computing devices, application servers, web servers, database servers, combinations of one or more of the same, and/or any other suitable physical storage devices.

Source devices 214 and 314 generally represents any type or form of physical storage device capable of communicating with (or being accessed by) one or more nodes and storing data grouped into logically sequential blocks. Examples of source device 214 and 314 include, without limitation, storage arrays, disk arrays, disk storage devices, disk array controllers, computing devices, application servers, web servers, database servers, combinations of one or more of the same, and/or any other suitable physical storage devices. Although FIGS. 2 and 3 illustrate source devices 214 and 314 independent of physical storage devices 206(1)-(N) and 306(1)-(N), source devices 214 and 314 may also represent one or more of physical storage devices 206(1)-(N) and 306(1)-(N). Additionally or alternatively, source devices 214 and 314 may represent one or more portions of memory located locally on nodes 202(1)-(N).

Networks 204 and 304 generally represent any medium or architecture capable of facilitating communication or data transfer. Examples of networks 204 and 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 700 in FIG. 7, or the like. Networks 204 and 304 may facilitate communication or data transfer using wireless or wired connections. In one embodiment, networks 204 and 304 may facilitate communication among the various devices included in computer clusters 208 and 308.

Figure 4:
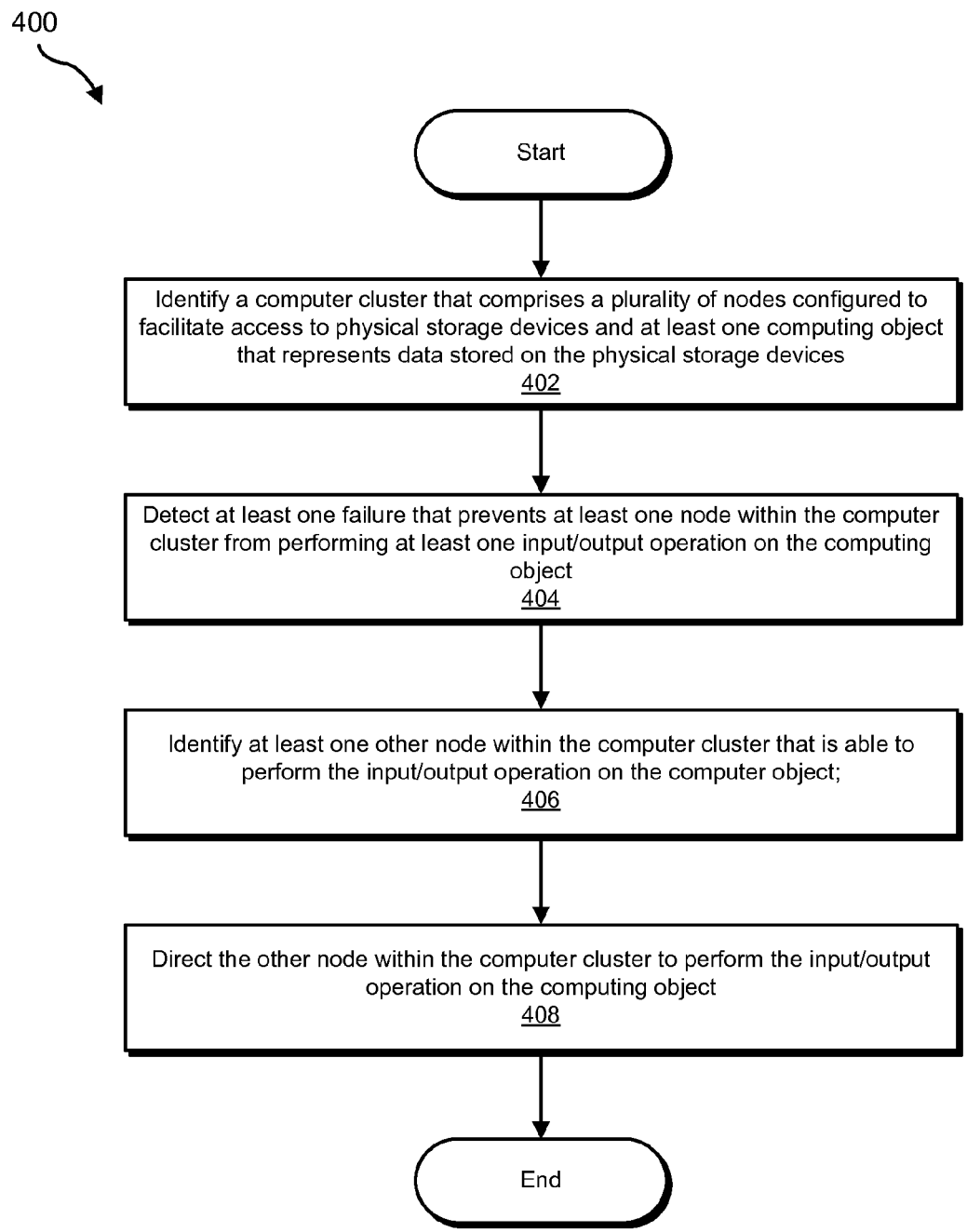
FIG. 4 is a flow diagram of an exemplary method for transferring input/output operations within computer clusters.

FIG. 4 is a flow diagram of an exemplary computer-implemented method 400 for transferring input/output operations within computer clusters. The steps shown in FIG. 4 may be performed by any suitable computer-executable code and/or computing system. In some embodiments, the steps shown in FIG. 4 may be performed by one or more of the components of system 100 in FIG. 1, system 200 in FIG. 2, system 300 in FIG. 3, computing system 610 in FIG. 6, and/or portions of exemplary network architecture 700 in FIG. 7.

As illustrated in FIG. 4, at step 402 the various systems described herein may identify a computer cluster that includes a plurality of nodes configured to facilitate access to a plurality of physical storage devices and at least one computing object that represents data stored on the physical storage devices. For example, identification module 104 may, as part of one or more of nodes 202(1)-(N), identify computer cluster 208 as including (1) nodes 202(1)-(N) configured to facilitate access to physical storage devices 206(1)-(N) via network 204 and (2) computing object 122 that represents data stored on physical storage devices 206(1)-(N). In one example, computing object 122 may include mirrored volume object 212 consisting of the collection of plex objects 210(1)-(N) stored on physical storage devices 206(1)-(N).

The systems described herein may perform step 402 in a variety of ways. In some examples, identification module 104 may identify computer cluster 208 by accessing information that identifies nodes 202(1)-(N) and/or physical storage devices 206(1)-(N) as part of computer cluster 208. For example, identification module 104 may analyze cluster information 126 to determine the configuration of computer cluster 208. In this example, cluster information 126 may identify one or more of nodes 202(1)-(N) and/or physical storage devices 206(1)-(N) included in computer cluster 208 based on an identification address (such as an IP address or a MAC address) and/or a registration key.

In addition, cluster information 126 may identify one or more of plex objects 210(1)-(N) and/or mirrored volume object 212 included in computer cluster 208. Identification module 104 may determine that computer cluster 208 includes nodes 202(1)-(N), physical storage devices 206(1)-(N), plex objects 210(1)-(N), and/or mirrored volume object 212 based at least in part on the analysis of cluster information 126.

In some examples, identification module 104 may identify computer cluster 208 by receiving a notification from each of nodes 202(1)-(N) and/or physical storage devices 206(1)-(N). For example, nodes 202(1)-(N) and/or physical storage devices 206(1)-(N) may each send a notification to identification module 104 to indicate that nodes 202(1)-(N) have been configured to provide high availability of one or more applications by facilitating access to plex objects 210(1)-(N) and/or mirrored volume object 212 stored on physical storage devices 206(1)-(N). In this example, nodes 202(1)-(N) and/or physical storage devices 206(1)-(N) may each send the notification as part of a boot-up process (initiated, e.g., when nodes 202(1)-(N) and/or physical storage devices 206(1)-(N) are powered on by a user). Identification module 104 may receive each notification from nodes 202(1)-(N) and/or physical storage devices 206(1)-(N) and then determine that computer cluster 208 includes nodes 202(1)-(N), physical storage devices 206(1)-(N), plex objects 210(1)-(N), and/or mirrored volume object 212 based at least in part on the received notifications.

In some examples, identification module 104 may probe nodes 202(1)-(N) and/or physical storage devices 206(1)-(N) via network 204 to determine the configuration of computer cluster 208. For example, identification module 104 may send a request for identification to each of nodes 202(1)-(N) and/or physical storage devices 206(1)-(N). In this example, in response to receiving the request for identification, nodes 202(1)-(N) and/or physical storage devices 206(1)-(N) may each send information that identifies the sending device as being included in computer cluster 208.

In addition, nodes 202(1)-(N) and/or physical storage devices 206(1)-(N) may send information that identifies one or more of plex objects 210(1)-(N) and/or mirrored volume object 212 as being included in computer cluster 208. Identification module 104 may receive this information from nodes 202(1)-(N) and/or physical storage devices 206(1)-(N) and then determine that the computer cluster 208 includes nodes 202(1)-(N), physical storage devices 210(1)-(N), plex objects 210(1)-(N), and/or mirrored volume object 212 based at least in part on the received information.

Moreover, identification module 104 may identify computer cluster 308 in FIG. 3 in any of the ways described above in connection with the identification of computer cluster 208. For example, identification module 104 may, as part of one or more of nodes 302(1)-(N), identify computer cluster 308 as including (1) nodes 302(1)-(N) configured to facilitate access to physical storage devices 306(1)-(N) via network 304 and (2) computing object 122 that represents data stored on physical storage devices 306(1)-(N). In one example, computing object 122 may include one or more of data stripes 310(1)-(N) representing unique data allocated alternately and evenly across physical storage devices 306(1)-(N). In another example, computing object 122 may include striped volume object 312 consisting of the collection of data stripes 310(1)-(N) allocated across physical storage devices 306(1)-(N).

Returning to FIG. 4, at step 404 the various systems described herein may detect at least one failure that prevents at least one node within the computer cluster from performing at least one input/output operation on the computing object that represents the data stored on the physical storage devices. For example, detection module 106 may, as part of one or more of nodes 202(1)-(N), detect at least one failure that prevents node 202(1) from performing at least one input/output operation on plex objects 210(1)-(N). In this example, the input/output operation may include one or more read and/or write operations targeting plex objects 210(1)-(N).

The systems described herein may perform step 404 in a variety of ways. In some examples, detection module 106 may determine that node 202(1) is unable to perform the input/output operation on plex objects 210(1)-(N). For example, detection module 106 may be configured to monitor the attempts by node 202(1) to access physical storage devices 206(1)-(N). In one example, node 202(1) may receive a request to perform the same write operation on each of plex objects 210(1)-(N). Upon receiving the request, node 202(1) may unsuccessfully attempt to perform the same write operation on each of plex objects 210(1)-(N).

In one example, node 202(1) may fail to satisfy the request to perform the write operation on plex objects 206(1)-(N) due to a hardware or software failure impairing at least one of the node's communication ports. In another example, node 202(1) may fail to satisfy the request to perform the write operation on plex objects 206(1)-(N) due to a physical disconnection or failure of at least one communication link between node 202(1) and physical storage devices 206(1)-(N).

While monitoring the attempts by node 202(1) to access physical storage devices 206(1)-(N), detection module 106 may detect the node's failure to satisfy the request to perform the write operation on plex objects 210(1)-(N). Detection module 106 may then determine that node 202(1) is unable to perform the write operation on plex objects 210(1)-(N) based at least in part on the node's failure to satisfy the request.

In some examples, detection module 106 may determine the scope of the failure preventing node 202(1) from performing the input/output operation on plex objects 210(1)-(N). In one example, detection module 106 may identify evidence of the failure. For example, detection module 106 may identify evidence that indicates or suggests that node 202(1) is unable to perform a particular read or write operation. The term "evidence," as used herein, generally refers to any type or form of information that indicates or suggests that a failure has occurred or may potentially occur at a future point in time.

In one example, detection module 106 may compare the evidence of the failure with information that identifies the hierarchy of computing objects stored on physical storage devices 206(1)-(N). For example, detection module 106 may access cluster information 126 that identifies a tree-like hierarchy of computing objects in which each of plex objects 210(1)-(N) represents a sub-tree of mirrored volume object 212. In this example, detection module 106 may compare the evidence of the failure with the tree-like hierarchy of computing objects to determine the scope of the failure relative to plex objects 210(1)-(N) and mirrored volume object 212.

In some examples, detection module 106 may determine that the scope of the failure is limited to one or more of plex objects 210(1)-210(N) based at least in part on the analysis of the evidence. For example, detection module 106 may determine that node 202(1) is able to read input/output data 124 from source object 216 stored in source device 214. In one example, detection module 106 may also determine that node 202(1) is unable to write input/output data 124 to one or more of plex objects 210(1)-210(N). Additionally or alternatively, detection module 106 may determine that node 202(1) is unable to write input/output data 124 to any portion of mirrored volume object 212.

In one example, detection module 106 may determine that node 202(1) is unable to read input/output data 124 from source object 216 stored in source device 214. In this example, detection module 106 may also determine that node 202(1) is able to write input/output data 124 to at least one or more of plex objects 210(1)-210(N). Additionally or alternatively, detection module 106 may determine that node 202(1) is able to write to all of mirrored volume object 212.

In one example, detection module 106 may determine that the failure impaired only a portion of mirrored volume object 212. For example, detection module 106 may determine that the failure impaired the ability of node 202(1) to access a set of multiple plex objects included in mirrored volume object 212 but did not impair the ability of node 202(1) to access another set of multiple plex objects included in mirrored volume object 212. In this example, detection module 106 may determine that node 202(N) is unable to perform at least a portion of the input/output operation on the set of multiple plex objects since the failure impaired the node's ability to access the set of multiple plex objects.

In one example, detection module 106 may determine that the failure impaired all of mirrored volume object 212. For example, detection module 106 may determine that the failure impaired the ability of node 202(1) to access any of plex objects 210(1)-(N) included in mirrored volume object 212. In this example, detection module 106 may determine that node 202(1) is unable to perform any portion of the input/output operation on mirrored volume object 212 since the failure impaired the node's ability to access any of plex objects 210(1)-(N) included in mirrored volume object 212.

Moreover, detection module 106 may detect at least one failure impairing node 302(1) in FIG. 3 in any of the ways described above in connection with the detection of the failure impairing node 202(1). For example, detection module 106 may, as part of one or more of nodes 302(1)-(N), detect at least one failure that prevents node 302(1) from performing at least one input/output operation on striped volume object 312. In this example, the input/output operation may include one or more read and/or write operations targeting data stripes 210(1)-(N) included in striped volume object 312.

Returning to FIG. 4, at step 406 the various systems described herein may identify at least one other node within the computer cluster that is able to perform the input/output operation on the computing object in response to the detected failure. For example, director module 108 may, as part of one or more of nodes 202(1)-(N), identify node 202(N) as being able to perform the input/output operation on plex objects 210(1)-(N). In this example, director module 108 may initiate the process of identifying node 202(N) in response to the detection of the failure preventing node 202(1) from performing the input/output operation.

The systems described herein may perform step 406 in a variety of ways. In some examples, director module 108 may query node 202(N) to determine whether node 202(N) is able to access one or more of plex objects 210(1)-(N). For example, director module 108 may prompt node 202(N) to attempt to access plex objects 210(1)-(N). In this example, node 202(N) may successfully access one or more of plex objects 210(1)-(N) in response to the prompt from director module 108. Node 202(N) may then notify director module 108 of the node's ability to access one or more of plex objects 210(1)-(N).

In some examples, director module 108 may query node 202(N) to determine whether node 202(N) has local access to input/output data 124 via the node's onboard memory. For example, director module 108 may prompt node 202(N) to search the memory located locally on node 202(N) for input/output data 124. In this example, node 202(N) may successfully locate input/output data 124 while searching the memory located locally on node 202(N) in response to the prompt from director module 108. Node 202(N) may then notify director module 108 of the node's ability to access input/output data 124 locally via the node's onboard memory.

In some examples, director module 108 may determine that none of nodes 202(1)-(N) is able to individually perform the input/output operation on plex objects 210(1)-(N). For example, director module 108 may analyze the scope of the detected failure to determine the individual abilities of nodes 202(1)-(N) to perform certain portions of the input/output operation. In one example, the detected failure may prevent node 202(N) from reading input/output data 124 from source object 216 and node 202(1) from writing input/output data 124 to plex objects 210(1)-(N). Conversely, the detected failure may not have impaired the ability of node 202(1) to read input/output data 124 from source object 216 or the ability of node 202(N) to write input/output data 124 to plex objects 210(1)-(N).

Moreover, director module 108 may identify node 302(N) in FIG. 3 in any of the ways described above in connection with the identification of node 202(N). For example, director module 108 may, as part of one or more of nodes 302(1)-(N), identify node 302(N) as being able to perform the input/output operation on data stripes 310(1)-(N) included in striped volume object 312. In this example, director module 108 may initiate the process of identifying node 302(N) in response to the detection of the failure preventing node 302(1) from performing the input/output operation.

Returning to FIG. 4, at step 408 the various systems described herein may direct the other node within the computer cluster to perform the input/output operation on the computing object in response to the detected failure. For example, director module 108 may, as part of one or more of nodes 202(1)-(N), direct node 202(N) to perform the input/output operation on plex objects 210(1)-(N). In this example, director module 108 may initiate the process of directing node 202(N) to perform the input/output operation upon identifying node 202(N) as being able to perform the input/output operation on plex objects 210(1)-(N).

The systems described herein may perform step 408 in a variety of ways. In one example, director module 108 may identify input/output data that facilitates performing the input/output operation on one or more of plex objects 210(1)-(N). For example, director module 108 may identify a single instance of input/output data 124 that was obtained by node 202(1) from source object 216. In this example, director module 108 may direct node 202(1) to transfer the single instance of input/output data 124 to node 202(N) via network 204. By transferring a single instance of input/output data 124 from node 202(1) to node 202(N) instead of transferring a different instance of input/output data 124 for each of physical storage devices 206(1)-(N) storing plex objects 210(1)-(N), the systems described herein may reduce the amount of network traffic associated with input/output shipping.

In one example, upon initiating the transfer of the single instance of input/output data 124 from node 202(1) to 202(N), director module 108 may enable node 202(N) to perform the input/output operation on plex objects 210(1)-(N) based at least in part on the transferred single instance of input/output data 124. For example, director module 108 may direct node 202(N) to specifically target plex objects 210(1)-(N) with Globally Unique Identifiers (GUIDs). In this example, director module 108 may direct node 202(N) to use the single instance to copy at least a portion of input/output data 124 to each of plex objects 210(1)-(N) targeted by the GUIDs. By using the transferred single instance to copy at least a portion of input/output data 124 to each of plex objects 210(1)-(N), the systems described herein may reduce the amount of time needed to complete the input/output operation shipped from node 202(1) to node 202(N).

In one example, director module 108 may direct node 202(N) to obtain a single instance of input/output data 124 from source object 216 in order to perform the input/output operation. For example, director module 108 may create a list 500 in FIG. 5 that identifies source object 216 as storing input/output data 124 to be written to each of plex objects 210(1)-(N). In this example, director module 108 may provide list 500 to node 202(N) to enable node 202(N) to obtain a single instance of input/output data 124 from source object 216 and then use the obtained single instance to write input/output data 124 to each of plex objects 210(1)-(N).

Figure 5:
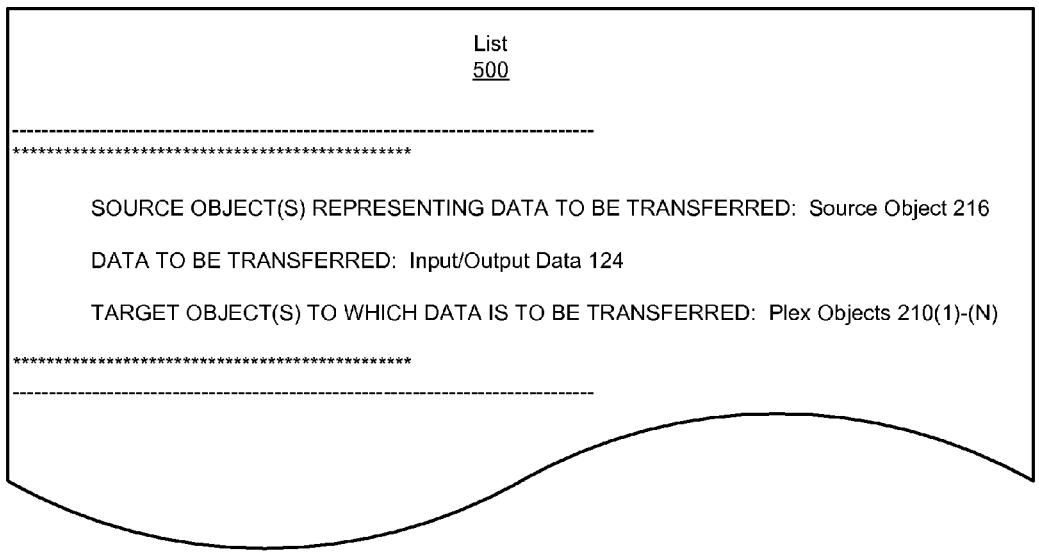
FIG. 5 is an illustration of an exemplary list that identifies input/output shipping information.

As shown in FIG. 5, list 500 may identify the source object that stores the input/output data to be transferred during input/output shipping (in this example, "Source Object 216"), the input/output data to be transferred during input/output shipping (in this example, "Input/Output Data 124"), and the target object to which the input/output data is to be transferred during input/output shipping (in this example, "Plex Objects 210(1)-(N)").

In one example, upon determining that none of nodes 202(1)-(N) is able to individually perform the input/output operation on mirrored volume object 212, director module 108 may determine that node 202(1) is only able to access plex object 210(1) included in mirrored volume object 212 but node 202(N) is able to access every other plex object included in mirrored volume object 212. In this example, director module 108 may direct node 202(1) to obtain a single instance of input/output data 124 from source object 216 and then write input/output data 124 to plex object 210(1) since node 202(1) is able to access only plex object 210(1). In addition, director module 108 may direct node 202(N) to obtain input/output data 124 from source object 216 or node 202(1) and then write input/output data 124 to every other plex object included in mirrored volume object 212 since node 202(1) is unable to access any of the other plex object(s) included in mirrored volume object 212.

In one example, director module 108 may direct node 202(N) to obtain input/output data 124 from source object 216 and then transfer input/output data 124 to node 202(1). For example, director module 108 may provide node 202(N) with the address (including, e.g., a specific offset and length) of the location at which input/output data 124 is stored in source object 216. In this example, director module 108 may direct node 202(N) to use the memory address to locate and read input/output data 124 from source object 216. Director module 108 may then direct node 202(N) to transfer a single instance of input/output data 124 to node 202(1) such that node 202(1) is able to write input/output data 124 to one or more of plex objects 210(1)-(N) included in mirrored volume object 212.

In one example, director module 108 may select which source object(s) are to facilitate transferring input/output data 124 to one or more of plex objects 210(1)-(N) included in mirrored volume object 212. For example, director module 108 may select source object 216 based at least in part on one or more predefined criteria. In this example, upon selecting source object 216 based at least in part on the predefined criteria, director module 108 may direct one or more of nodes 202(1)-(N) to read input/output data 124 from source object 216 in order to transfer input/output data 124 to one or more of plex objects 210(1)-(N) included in mirrored volume object 212. Examples of the predefined criteria used to select the source object(s) include, without limitation, a preference for the selected source object(s), one or more attributes or characteristics of the selected source object(s), the proximity between the target node and the selected source object(s), and/or any other suitable predefined criteria.

In some examples, director module 108 may determine the optimal object level (or most efficient object level) within the hierarchy of computing objects to perform the input/output shipping based at least in part on the scope of the failure. For example, director module 108 may analyze the scope of the failure to identify the highest-level object within the hierarchy of computing objects that encompasses the entire failure. Upon identifying the highest-level object within the hierarchy of computing objects that encompasses the entire failure, director module 108 may facilitate transferring the input/output operation at the level associated with the identified highest-level object.

In one example, in the event that node 202(1) is able to access a set of multiple plex objects included in mirrored volume object 212 but unable to access another set of multiple plex objects included in mirrored volume object 212, director module 108 may transfer at least a portion of the input/output operation from node 202(1) to node 202(N) at the plex level instead of the volume or device level. For example, director module 108 may direct node 202(1) to write input/output data 124 to the set of multiple plex objects accessible to node 202(1) and node 202(N) to write input/output data 124 to the other set of multiple plex objects that were inaccessible to node 202(1). By performing at least a portion of the input/output operation locally (i.e., at the original node), the systems described herein may avoid overloading the other nodes included in computer cluster 208.

In another example, in the event that node 202(1) is unable to perform any portion of the input/output operation on any of plex objects 210(1)-(N) included in mirrored volume object 212, director module 108 may transfer at least a portion of the input/output operation from node 202(1) to node 202(N) at the volume level instead of the plex or device level. For example, director module 108 may direct node 202(N) to write input/output data 124 to all of mirrored volume object 212 since node 202(1) is unable to access any of plex objects 210(1)-(N) included in mirrored volume object 212.

In a further example, in the event that node 202(1) is unable to perform any portion of the input/output operation on any of the plex or volume objects stored on one or more of physical storage devices 206(1)-(N), director module 108 may transfer at least a portion of the input/output operation from node 202(1) to node 202(N) at the device level instead of the plex or volume level. For example, director module 108 may direct node 202(N) to write input/output data 124 directly to one or more of physical storage devices 206(1)-(N) since node 202(1) is unable to access any of the plex or volume objects stored on the physical storage device(s).

In some examples, upon determining that node 202(N) has local access to input/output data 124 via the node's onboard memory, director module 108 may direct node 202(N) to perform at least a portion of the input/output operation without obtaining input/output 124 from source object 216. For example, director module 108 may direct node 202(N) to read input/output data 124 from the node's onboard memory. In this example, director module 108 may then direct node 202(N) to write input/output data 124 to one or more of plex objects 210(1)-(N) included in mirrored volume 212.

Moreover, director module 108 may direct node 302(N) in FIG. 3 in any of the ways described above in connection with the direction of node 202(N). For example, director module 108 may, as part of one or more of nodes 302(1)-(N), direct node 302(N) to perform the input/output operation on striped volume object 312. In this example, director module 108 may initiate the process of directing node 302(N) to perform the input/output operation in response to the detection of the failure preventing node 302(1) from performing the input/output operation.

Figure 6:
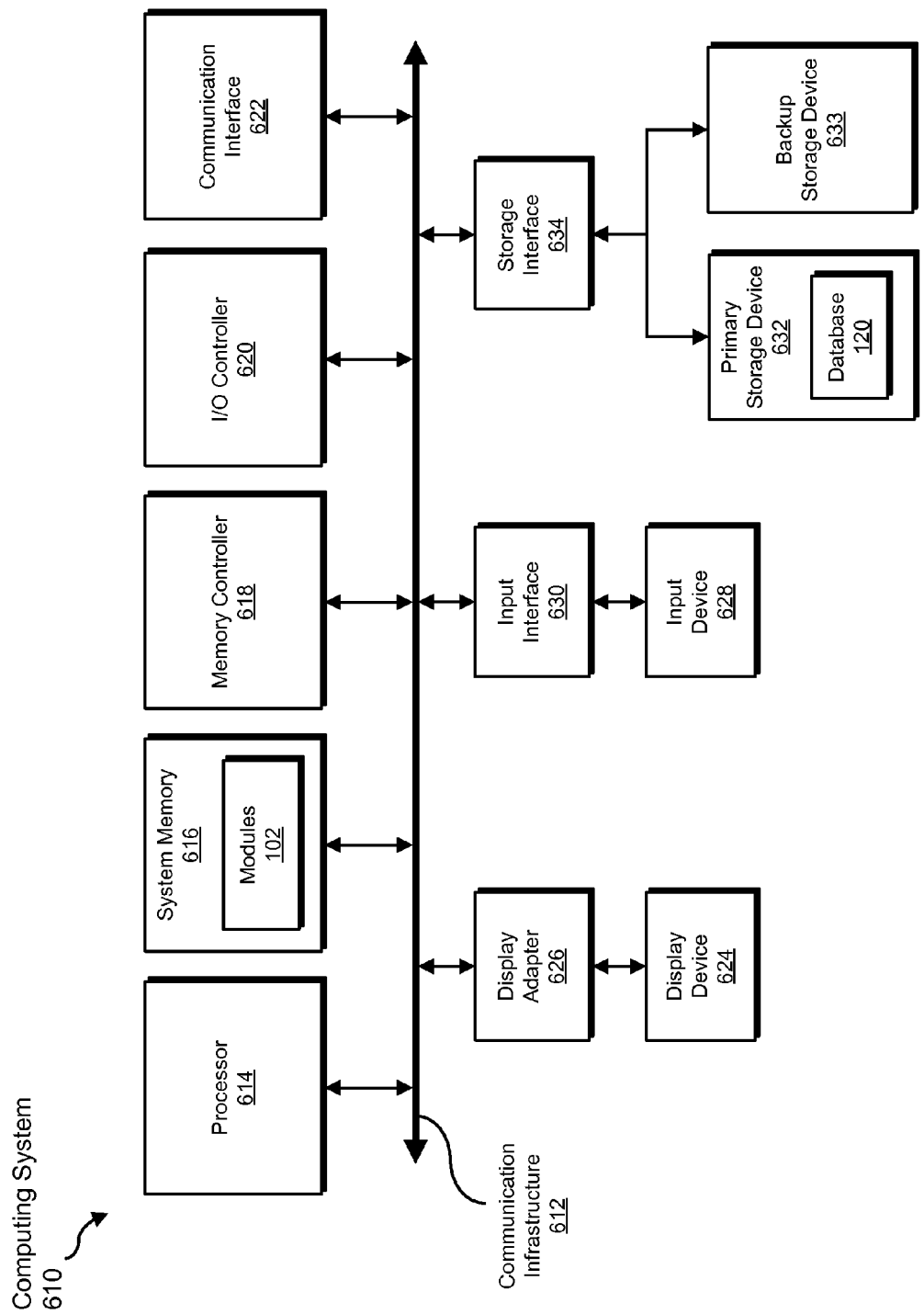
FIG. 6 is a block diagram of an exemplary computing system capable of implementing one or more of the embodiments described and/or illustrated herein.

FIG. 6 is a block diagram of an exemplary computing system 610 capable of implementing one or more of the embodiments described and/or illustrated herein. For example, all or a portion of computing system 610 may perform and/or be a means for performing, either alone or in combination with other elements, one or more of the identifying, detecting, directing, transferring, enabling, analyzing, targeting, using, creating, and providing steps described herein. All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of processing unit capable of processing data or interpreting and executing instructions. In certain embodiments, processor 614 may receive instructions from a software application or module. These instructions may cause processor 614 to perform the functions of one or more of the exemplary embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In certain embodiments, exemplary computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

Communication interface 622 broadly represents any type or form of communication device or adapter capable of facilitating communication between exemplary computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

As illustrated in FIG. 6, computing system 610 may also include at least one display device 624 coupled to communication infrastructure 612 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, exemplary computing system 610 may also include at least one input device 628 coupled to communication infrastructure 612 via an input interface 630. Input device 628 generally represents any type or form of input device capable of providing input, either computer or human generated, to exemplary computing system 610. Examples of input device 628 include, without limitation, a keyboard, a pointing device, a speech recognition device, or any other input device.

As illustrated in FIG. 6, exemplary computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 634 generally represents any type or form of interface or device for transferring data between storage devices 632 and 633 and other components of computing system 610. In one example, database 120 from FIG. 1 may be stored in primary storage device 632.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, non-transitory-type media, such as magnetic-storage media (e.g., hard disk drives and floppy disks), optical-storage media (e.g., Compact Disks (CDs) or Digital Video Disks (DVDs)), electronic-storage media (e.g., solid-state drives and flash media), and other distribution systems.

The computer-readable-storage medium containing the computer program may be loaded into computing system 610. All or a portion of the computer program stored on the computer-readable-storage medium may then be stored in system memory 616 and/or various portions of storage devices 632 and 633. When executed by processor 614, a computer program loaded into computing system 610 may cause processor 614 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 610 may be configured as an Application Specific Integrated Circuit (ASIC) adapted to implement one or more of the exemplary embodiments disclosed herein.

Figure 7:
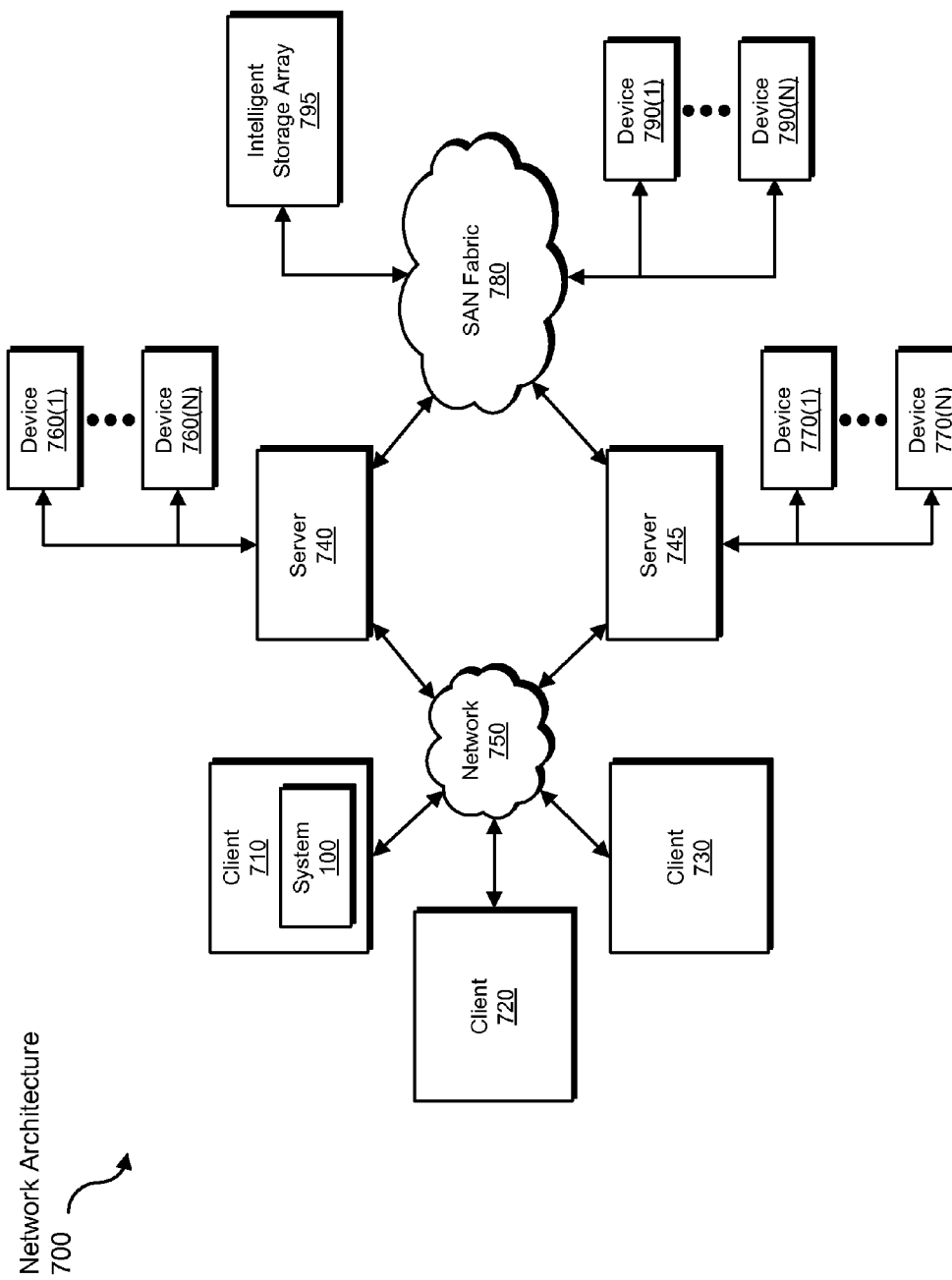
FIG. 7 is a block diagram of an exemplary computing network capable of implementing one or more of the embodiments described and/or illustrated herein.

FIG. 7 is a block diagram of an exemplary network architecture 700 in which client systems 710, 720, and 730 and servers 740 and 745 may be coupled to a network 750. As detailed above, all or a portion of network architecture 700 may perform and/or be a means for performing, either alone or in combination with other elements, one or more of the identifying, detecting, directing, transferring, enabling, analyzing, targeting, using, creating, and providing steps disclosed herein. All or a portion of network architecture 700 may also be used to perform and/or be a means for performing other steps and features set forth in the instant disclosure.

Client systems 710, 720, and 730 generally represent any type or form of computing device or system, such as exemplary computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 730 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 730 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to exemplary computing system 610 of FIG. 6, a communication interface, such as communication interface 622 in FIG. 6, may be used to provide connectivity between each client system 710, 720, and 730 and network 750. Client systems 710, 720, and 730 may be able to access information on server 740 or 745 using, for example, a web browser or other client software. Such software may allow client systems 710, 720, and 730 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the exemplary embodiments disclosed herein may also be encoded as a computer program, stored in server 740, run by server 745, and distributed to client systems 710, 720, and 730 over network 750.

As detailed above, computing system 610 and/or one or more components of network architecture 700 may perform and/or be a means for performing, either alone or in combination with other elements, one or more steps of an exemplary method for transferring input/output operations within computer clusters.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may identify at least one target computing object (e.g., mirrored volume object 212) that includes data stored on a plurality of physical storage devices (e.g., physical storage devices 206(1)-(N)), obtain a single instance of input/output data (e.g., input/output data 124) from a source object (e.g., source object 216), transfer the single instance of input/output data over a network (e.g., network 204), transform the data represented by the target computing object by writing a single instance of input/output data to the target computing object, and store the transformed target computing object to complete at least one input/output operation shipped from one node (e.g., node 202(1)) to another node (e.g., node 202(N)) within a computer cluster. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for transferring input/output operations within computer clusters, at least a portion of the method being performed by a computing device comprising at least one processor, the method comprising:
   identifying a computer cluster that comprises:
      a plurality of nodes configured to facilitate access to a plurality of physical storage devices;
      at least one computing object that represents data stored on the physical storage devices;
   detecting at least one failure that prevents at least one node within the computer cluster from performing at least one input/output operation on at least a portion of the computing object that represents the data stored on the physical storage devices, wherein detecting the failure comprises determining that the node is unable to perform the input/output operation on the portion of the computing object by determining that the node within the computer cluster is:
      able to access at least one source object that comprises input/output data to be written to the portion of the computing object as part of the input/output operation;
      unable to access the portion of the computing object;
   in response to detecting the failure:
      identifying at least one other node within the computer cluster that is able to perform the input/output operation on the portion of computing object by determining that the other node within the computer cluster is able to access the portion of the computing object;
      directing the node within the computer cluster to:
         obtain, from the source object, a single instance of input/output data that facilitates performing the input/output operation on the portion of the computing object;
         transfer a single instance of the input/output data to the other node instead of transferring a different instance of input/output data for each physical storage device storing the data represented by the computing object;
         enable the other node to use the transferred single instance to write the input/output data to the portion of the computing object by copying at least a portion of the transferred single instance to at least a portion of each physical storage device that stores the data represented by the computing object.

2. The method of claim 1, wherein the computing object comprises at least one of:
   one or more plex objects that represent duplicate copies of data stored on the plurality of physical storage devices;
   a mirrored volume object that comprises a plurality of plex objects that represent duplicate copies of data stored on the plurality of physical storage devices;
   a striped volume object that comprises a plurality of logically sequential stripes of data stored on the plurality of physical storage devices.

3. The method of claim 1, wherein detecting the failure that prevents the node within the computer cluster from performing the input/output operation comprises:
   analyzing evidence of the failure;
   determining, based at least in part on the analysis of the evidence, that the scope of the failure is limited to the computing object.

4. The method of claim 3, further comprising directing the other node to perform the input/output operation by specifically targeting the computing object instead of targeting the plurality of physical storage devices since the scope of the failure is limited to the computing object.

5. The method of claim 4, wherein directing the other node within the computer cluster to perform the input/output operation comprises:
   identifying at least one source object that comprises additional input/output data to be written to the computing object as part of the input/output operation;
   directing the other node to:
      obtain a single instance of the additional input/output data from the source object;
      use the single instance to write the additional input/output data to the computing object instead of obtaining a different instance of the additional input/output data for each physical storage device storing the data represented by the computing object.

6. The method of claim 1, further comprising:
   determining that the node within the computer cluster is able to access another portion of the computing object.

7. The method of claim 6, further comprising directing the other node to:
   identify at least one source object that comprises additional input/output data to be written to the computing object;
   directing the node to:
      obtain a single instance of the additional input/output data from the source object;
      use the obtained single instance to write the additional input/output data to the other portion of the computing object since the node is able to access the other portion of the computing object.

8. The method of claim 1, wherein identifying the other node within the computer cluster that is able to perform the input/output operation comprises determining that none of the nodes included in the computer cluster is able to individually perform the input/output operation on the computing object.

9. The method of claim 1, wherein directing the node within the computer cluster comprises directing the node to:
   create a list that identifies:
      the source object that comprises the input/output data;
      the portion of the computing object;
   providing the list to the other node to enable the other node to perform the input/output operation on the portion of the computing object based at least in part on the single instance of input/output data transferred to the other node.

10. The method of claim 1, wherein the input/output operation comprises at least one of:
   at least one read operation targeting the portion of the computing object;
   at least one write operation targeting the portion of the computing object.

11. The method of claim 1, wherein enabling the other node to use the transferred single instance to write the input/output data comprises providing the other node with an address of the input/output data.

12. The method of claim 1, wherein directing the node to obtain the single instance of the input/output data from the source object comprises selecting a source object based on at least one of:
   a preference for the selected source object;
   at least one characteristic of the source object;
   proximity between the other node and the source object.

13. The method of claim 1, further comprising directing the node to perform at least a portion of the input/output operation by reading data from the node's onboard memory.

14. A system for transferring input/output operations within computer clusters, the system comprising:
   an identification module, stored in memory, that identifies a computer cluster that comprises:
      a plurality of nodes configured to facilitate access to a plurality of physical storage devices;
      at least one computing object that represents data stored on the physical storage devices;
   a detection module, stored in memory, that:
      detects at least one failure that prevents at least one node within the computer cluster from performing at least one input/output operation on at least a portion of the computing object that represents the data stored on the physical storage devices, wherein detecting the failure comprises determining that the node is unable to perform the input/output operation on the portion of the computing object by determining that the node within the computer cluster is:
         able to access at least one source object that comprises input/output data to be written to the portion of the computing object as part of the input/output operation;
         unable to access the portion of the computing object;
   a director module, stored in memory, that:
      identifies at least one other node within the computer cluster that is able to perform the input/output operation on the portion of the computing object by determining that the other node within the computer cluster is able to access the portion of the computing object;
      directs the node within the computer cluster to:
         obtain, from the source object, a single instance of input/output data that facilitates performing the input/output operation on the portion of the computing object;
         transfer the single instance of the input/output data to the other node instead of transferring a different instance of input/output data for each physical storage device storing the data represented by the computing object;
         enable the other node to use the transferred single instance to write the input/output data to the portion of the computing object by copying at least a portion of the transferred single instance to at least a portion of each physical storage device that stores the data represented by the computing object;
   at least one processor that executes the identification module, the detection module, and the director module.

15. The system of claim 14, wherein the computing object comprises at least one of:
   one or more plex objects that represent duplicate copies of data stored on the plurality of physical storage devices;
   a mirrored volume object that comprises a plurality of plex objects that represent duplicate copies of data stored on the plurality of physical storage devices;
   a striped volume object comprising a plurality of logically sequential stripes of data stored on the plurality of physical storage devices.

16. The system of claim 14, wherein the detection module further:
   analyzes evidence of the failure;
   determines, based at least in part on the analysis of the evidence, that the scope of the failure is limited to the computing object.

17. The system of claim 16, wherein the director module further directs the other node to perform the input/output operation by specifically targeting the computing object instead of targeting the plurality of physical storage devices since the scope of the failure is limited to the computing object.

18. The system of claim 14, wherein the director module further:
  identifies at least one source object that comprises additional input/output data to be written to the computing object as part of the input/output operation;
  directs the other node to:
    obtain a single instance of the additional input/output data from the source object;
    use the single instance to write the additional input/output data to the computing object instead of obtaining a different instance of additional input/output data for each physical storage device storing the data represented by the computing object.

19. A non-transitory computer-readable-storage medium comprising one or more computer-executable instructions that, when executed by at least one processor of a computing device, cause the computing device to:
  identify a computer cluster that comprises:
    a plurality of nodes configured to facilitate access to a plurality of physical storage devices;
    at least one computing object that represents data stored on the physical storage devices;
  detect at least one failure that prevents at least one node within the computer cluster from performing at least one input/output operation on at least a portion of the computing object that represents the data stored on the physical storage devices, wherein detecting the failure comprises determining that the node is unable to perform the input/output operation on the portion of the computing object by determining that the node within the computer cluster is:
    able to access at least one source object that comprises input/output data to be written to the portion of the computing object as part of the input/output operation;
    unable to access the portion of the computing object;
  in response to detecting the failure:
    identify at least one other node within the computer cluster that is able to perform the input/output operation on the portion of the computing object by determining that the other node within the computer cluster is able to access the portion of the computing object;
    direct the node within the computer cluster to:
      obtain, from the source object, a single instance of input/output data that facilitates performing the input/output operation on the portion of the computing object;
      transfer the single instance of the input/output data to the other node instead of transferring a different instance of input/output data for each physical storage device storing the data represented by the computing object;
      enable the other node to use the transferred single instance to write the input/output data to the portion of the computing object by copying at least a portion of the transferred single instance to at least a portion of each physical storage device that stores the data represented by the computing device.

* * * * *